2,802,860

METHOD OF MANUFACTURE OF PHTHALIC ESTERS OF ANOSMIC CHARACTER

Aaron Stack, Park Forest, and Earl G. Shaver, Chicago, Ill., assignors to The Sherwin-Williams Company, Cleveland, Ohio, a corporation of Ohio No Drawing. Application August 6, 1954, Serial No. 448,362

8 Claims. (Cl. 260—475)

This invention relates to a method of improving the anosmic character of plasticizing phthalic acid and phthalic anhydride esters.

More particularly, this invention relates to a method of improving the odor characteristic of phthalic anhydride and phthalic acid esters of mono-alcohols. Conventionally, plasticizers of the phthalic ester class are produced by condensing aliphatic mono-alcohols containing not more than about 20 carbon atoms with phthalic anhydride to form neutral products. The invention of interest is directed primarily to the dibutyl through distearyl esters of phthalic anhydride. Optionally, the isomeric forms of phthalic acid including isophthalic and terephthalic acid as well as phthalic derivatives including chlorendic acid, tetrahydro phthalic anhydride, hexahydro phthalic anhydride, etc., may be employed in producing esters of interest. Phthalic esters of this class are used extensively as plasticizers in molding compositions, films, extrusions and in the protective and decorative coatings field, e. g. vinyl coatings, in order to improve the flexibility and toughness of the ultimate plastic composition. Phthalic esters improved by the method herein disclosed are particularly important in the manufacture of polymeric films where the thin sheet material products are useful in the wrapping of foods and other commodities sensitive to odor.

Critical examination of commercially available products of the phthalic acid ester plasticizers reveals odor characteristics in most cases are of objectionable nature. Neutral phthalic acid esters have been produced by conventional esterification methods generally accepted in the art. In using conventional procedures, the final odor of the product left something to be desired. Invariably one could detect odors of unremoved higher molecular weight alcohols, decomposition odors which are suggestive of higher molecular weight aldehydes or other odors foreign to those that might be deemed characteristic of esters.

Production of neutral esters of phthalic anhydride or phthalic acid and the mono-alcohols commonly used in the production of commercial plasticizers is normally carried out in the presence of an aromatic solvent. Aromatic solvents are selected because of their high solvency characteristic. Toluene, for example, has a Kauri-butanol value of 94 and xylene and a Kauri-butanol value of 87. Toluene is usually the solvent selected in esterification reactions, primarily because it forms an azeotrope with water-of-reaction and assists in its removal and secondarily, because of its good solvency qualities for the reactants, it provides a homogeneous reaction mass.

As is general in commercial esterification reactions, one of the reactants is employed in excess. The one in excess usually accords with the less costly of the acid and alcohol used in the ester. As a rule it is not feasible to carry the reaction to completion using up the ingredient in the lesser proportion. When the reaction is essentially complete one may neutralize excess acid in the ester by treatment with a dilute aqueous solution of a base. For example, a 3% solution of caustic soda is satisfactorily employed.

After neutralization of free acid present in the reaction mass, the caustic-water layer is separated and discarded. Thereafter, the neutralized crude ester is transferred to a flask capable of withstanding vacuum distillation. Solvent used in assisting in the esterification reaction is removed under vacuum of from about 150 mm. down to about 15 mm. of mercury. Steam distillation may be used to assist. After all of the aromatic carrier solvent has been removed, the crude ester may be subjected to steam distillation in order to purify the product further by elimination of unreacted alcohol and other contaminates subject to removal by this means. It is also standard procedure to control the temperature below established limits to avoid hydrolysis of the product ester. In a number of tests, the crude ester has been subject under vacuum and heat to blowing with inert gases including carbon dioxide, nitrogen, steam, etc. Following these prior art practices odors of partial decomposition of the esters, or of the components of the esters, persist.

It has been observed that the esterification catalyst has some effect upon the nature and extent of contaminant odors. A considerable number of esterification catalysts have been tried, but with this change alone objectionable odor in the end product is not overcome. We prefer to employ an aqueous solution of sodium bisulfate as catalyst, however, in most instances.

Phthalic esters of the plasticizer type are of high molecular weight and should theoretically be without odor (anosmic) as they are practically non-volatile and insoluble in water. Odor producing bodies are generally of low molecular weight, most often volatile and soluble in both water and solvents. It was felt that under such circumstances it should be possible to produce an utterly bland (anosmic) phthalic acid ester for plasticizing purposes.

It is, therefore, the principal object of this invention to provide a means either to prevent the formation of, or remove from the ester, odorivector substances from the esters formed by condensation of phthalic acids with mono-alcohols containing not more than about 20 carbon atoms.

A study of the methods standardly used for removal of odors was somewhat discouraging and the most promising suggestion appeared to lie in the alteration of the conditions under which the process took place. Odor masking was felt undesirable as such means merely overcome one odor by superimposing another to creat a more compelling olefactory sensation.

In one of the experiments in our research a commercial formaldehyde solution was added to the crude product following removal of aromatic solvent. Thereafter the mixture of the commercial formaldehyde solution and the crude ester were subject to steam distillation under vacuum as is normal procedure. Improvement in odor of the recovered ester was striking. Upon inquiry, commercial formaldehyde solution was found to contain methanol. The methanol used in the manufacture of commercial formaldehyde solutions was identified merely as the "heads." The "heads" methanol fraction was found to contain methanol, acetone and petroleum naphtha. Accordingly, samples of each of these ingredients was obtained in as pure a form as possible and added in trace amount (1 gram per 500 grams ester) to one of the crude plasticizing esters, prior to vacuum steam distillation. In the test using petroleum naphtha as an additive, improvement was outstanding. Thereafter, a ladder was run with petroleum naphtha by means of which it was determined that as little as 1/20th of 1% of that solvent added to the crude ester, prior to steam distillation, produced a practically odor-free product. If temperature conditions were maintained within a limit of from 85° to not more than about 140° C. a bland anosmic product was obtained in test after test. A study was inaugurated to determine what other petroleum hydrocarbons were equivalent to petroleum naphtha for the purpose of deodorizing phthalic acid plasticizer esters. As a low boiling fraction, petroleum ether was selected; and as a high boiling substance sulfur-free kerosene was scheduled for test. It was determined that petroleum ether, naphtha and kerosene were all equally efficacious in very minor quantity for the purposes of odor removal. All of the hydrocarbons of the methane series were found to be effective for the purposes and objects of odor removal. Petrolatum was also tried as a species representing the very heavy, ultimate end of the range of useful compounds in the methane series. This additive also proved to be effective.

Thus, it was determined that the aliphatic hydrocarbons of the methane series ($C_nH_{2n+2}$) were effective for deodorizing purposes.

Having determined that the aliphatic hydrocarbons of the methane series were valuable in reducing the odor of plasticizers of interest, the process of manufacture of these esters was again examined in the light of the improvement obtained. Study of the method indicated that the toluene used in azeotropic distillation of the water of esterification might be replaced with an aliphatic hydrocarbon distillate. Objection was raised to lack of solubility characteristics of the aliphatic hydrocarbons (aliphatic hydrocarbons have a Kauri-butanol of 35 or less whereas aromatic solvents heretofore employed in azeotropic distillations are characterized by a Kauri-butanol value in excess of 80). Despite objection to the aliphatic hydrocarbons as a means of assisting in solvent esterification of phthalic anhydride with high molecular weight mono-alcohols, a test run was made wherein toluene was substituted for by heptane. Heptane was selected for trial as it most nearly corresponds to toluene in boiling point range amongst the readily available hydrocarbon fractions from petroleum. The reaction mass remained cloudy for a period longer than when toluene is employed, but in due course the reaction mass became clear and all of the phthalic anhydride went into solution. The theoretical quantity of water was obtained in the sidearm distillation trap. The completed crude ester was subjected to washing with dilute aqueous caustic solution and excess solvent removed by distillation under vacuum at a temperature above 85° but less than 140° C. Temperatures above about 140° C. tend to cause objectionable color development. The ester was thereafter subjected to steam distillation under vacuum as in the older standard process in order to maintain conditions comparable. Surprisingly, the resultant purified ester was entirely free of odor, even when warm. Duplications of similar test runs established that aromatic solvents were not essential and that it is unnecessary that phthalic anhydride be in solution during the early part of the reaction. Additional experimental runs proved straight chain hydrocarbon distillates varying from petroleum ether to kerosene could be used in lieu of toluene and xylene. Economies result from the substitution, for aside from the variation in solvent cost per unit, it was found the amount of solvent necessary for reflux could be reduced to half that previously employed with aromatic solvents.

In summary, the objects of this invention are attained by subjecting a plasticizing dicarboxylic acid ester of an aliphatic mono-alcohol to treatment with minor proportions of a saturated alkyl petroleum hydrocarbon at temperatures in the range of from 85° to not more than about 140° C. at less than atmospheric pressure. The following examples are illustrative:

Example I 500 grams of a neutral ester produced by reacting 2-ethyl hexanol in the proper molecular proportions with phthalic anhydride were transferred to a distilling vessel. To the crude ester was added .25 gram of petroleum ether and the two components were thoroughly agitated together. Meanwhile, the vessel was supplied with heat and taken to a minimum of 85° centigrade. Glass tubes were then adjusted in the vessel to provide a source of inert gas and to provide for vacuum distillation. Thereafter the pressure was reduced to 63 millimeters of mercury absolute and steam was admitted to the distillation flask through the content for a period of about five minutes. While the crude ester before treatment was odoriferous (odors present suggesting 2-ethyl hexanol and a higher molecular weight aldehyde) the treated material was absolutely bland.

Example II

Aliquot portions of the same batch of crude ester were treated with similar quantities of representative numbers of the methane series including petroleum ether, mineral spirits, kerosene and petroleum jelly or petrolatum. In each instance, the treated ester proved to be of anosmic quality.

Example III

A series of crude esters was made from phthalic anhydride and capryl alcohol, stearyl alcohol, hexyl alcohol, decyl alcohol and the dioctyl alcohols including di(2-ethyl hexyl), di-n-octyl, di-isooctyl and mixtures thereof. These various esters were treated with from 1/20th of a percent to 10% of a petroleum fraction sold as heptane containing minor traces of other hydrocarbons normally present in the heptane fraction as described in Example I. Each of the plasticizer esters when compared with the corresponding crude was of a markedly improved odor.

Example IV

As it is customary in the art to prepare the plasticizer esters of the class described above in the presence of a refluxing aromatic solvent, the improvement obtained through use of straight chain aliphatic solvents in the final purification step suggested that toluene be substituted for with petroleum distillates. Limitation as to the boiling point range was not considered critical but in order to control the temperature of esterification one having a toluene boiling point range was first selected; namely, heptane. The test run was made as follows:

Into a three-neck ground glass reaction vessel fitted with a stirrer, thermometer, Dean-Stark moisture trap and condenser, were weighed 572 parts of 2-ethyl hexanol
296 parts of phthalic anhydride
140 parts of heptane
12 parts of sodium bisulfate, dissolved in
30 parts of water.

The mixture was heated by means of a Glasco mantle. Reflux started at a temperature of 95° C. At the end of five hours reflux temperature had reached 138° C. and the amount of water necessary for theoretically complete esterification had been collected in the Dean-Stark trap. The crude product was washed with dilute alkali (3%) and extracted with several water washes.

The crude washed ester was placed under a vacuum, initially of 150 mm. of mercury (absolute), subjected to steam distillation at a temperature of 130° C. Final vacuum reached was about 100 mm. absolute at the end of the distillation. Upon comparison of this product with products made under toluene reflux and similar steam distillation conditions, it was found the odor had been materially lessened and none of the odors found in the comparative toluene run were discernible. Experimental results with other plasticizing esters made from other alcohols in the series described in Example III gave comparable results.

Example V 604 parts of capryl alcohol
300 parts of cyclohexane
2 parts of sulfuric acid 98% grade
32 parts of water
296 parts of phthalic anhydride were measured into equipment as described in prior examples. Sulfuric acid was added to water separately and the diluted acid catalyst stirred into the alcohol-cyclohexane mixture. Thereafter phthalic anhydride was added and the reaction mass heated to a maximum of about 130° C. After collection of the theoretical water from the Dean-Stark reaction vessel, the reaction mass was neutralized with a 3% aqueous caustic solution. The water-caustic layer was separated from the other reactants and discarded. The excess cyclohexane fraction was removed under a vacuum of about 50 millimeters of mercury absolute, the heating was not allowed to exceed about 130° centigrade. After removal of the solvent and excess alcohol the temperature was decreased to 110° centigrade and the vacuum increased to an absolute pressure of 75 millimeters of mercury. Thereafter, $CO_2$ was blown through the batch for a period of 5 minutes. After filtering the product through an inorganic filter aid, it was observed to be sparkling clear, water-white and of anosmic character.

The above examples as well as others in various series established that although the odor of a crude could be improved by the addition of minute amounts of one or mixtures of more than one saturated alkyl petroleum hydrocarbon, the same effect could be accomplished by substituting one of the identified aliphatic distillates for the azeotropic mixture-forming solvent. No theoretical explanation has been presented for the reason why a small amount of an aliphatic hydrocarbon removes objectionable odors whereas the presence of a large amount of an aromatic hydrocarbon seemed to intensify malodors resulting from the esterification of phthalic acids with the mono-alcohols as described.

Having thus described and illustrated our invention, what we claim is:

1. A method for producing odor-free plasticizing diesters of an aromatic dicarboxylic acid and a water insoluble aliphatic monoalcohol which comprises subjecting the ester to sparging with an inert gas at a temperature of from 85° C. to not more than 140° C. at an absolute pressure of not more than about 150 mm. of mercury in the presence of a quantity of a saturated aliphatic hydrocarbon of the methane series from petroleum ether to petrolatum sufficient to render the said ester substantially anosmic.

2. A method of producing the phthalic ester plasticizers of improved odor wherein the acid is selected from the group consisting of phthalic acid, isophthalic acid, terephthalic acid and phthalic anhydride and the alcohol is a water insoluble aliphatic monoalcohol containing not more than about 20 carbon atoms which comprises subjecting the ester to steam distillation at a temperature of from about 85° C. to not more than 140° C. under an absolute pressure of not more than about 150 mm. of mercury in the presence of a quantity of a saturated aliphatic hydrocarbon of the methane series from petroleum ether to petrolatum sufficient to render the said ester substantially anosmic.

3. A method of producing plasticizers of the phthalic ester class which comprises esterifying an acid selected from the group consisting of phthalic acid, isophthalic acid, terephthalic acid and phthalic anhydride with a water insoluble aliphatic monoalcohol containing not more than about 20 carbon atoms by adding to the reactants prior to esterification a quantity of an aliphatic petroleum hydrocarbon solvent of the general formula $C_nH_{2n+2}$ from petroleum ether to kerosene and subsequent to esterification, removing said solvent by steam stripping under an absolute pressure of not more than 15 millimeters of mercury and below a temperature not exceeding 140 C. said quantities of solvent sufficient to render said ester subsantially anosmic.

4. As in claim 3, where the mono-alcohol is octyl alcohol.

5. As in claim 3, where the mono-alcohol is capryl alcohol.

6. As in claim 3, where the mono-alcohol is decyl alcohol.

7. As in claim 3, where the mono-alcohol is 2-ethyl hexanol.

8. A method of rendering substantially neutral plasticizing esters of phthalic acids and water insoluble aliphatic mono-alcohols substantially anosmic which consists of subjecting said esters to heat treatment with a quantity of $\frac{1}{20}$ of 1% percent upwards of a volatile organic solvent selected from the group consisting of aliphatic and cycloaliphatic saturated hydrocarbon distillates at a temperature of at least 85° C. but not in excess of 140° C. at an absolute pressure not appreciably greater than 150 mm. of mercury.

References Cited in the file of this patent
UNITED STATES PATENTS

| | | |
|---|---|---|
| 1,732,392 | Wietzel | Oct. 22, 1929 |
| 2,005,381 | McDougal | June 18, 1935 |
| 2,147,488 | Hickman et al. | Feb. 14, 1939 |
| 2,701,261 | Perry et al. | Feb. 1, 1955 |